US012053812B2

(12) United States Patent
Kalweit et al.

(10) Patent No.: US 12,053,812 B2
(45) Date of Patent: Aug. 6, 2024

(54) MECHANICAL APPLICATOR FOR USE IN STAMPING DIE PROCESS TO APPLY THERMO-CHROMATIC INK TO ALUMINUM HEAT TREATED PANELS

(71) Applicant: Ford Motor Company, Dearborn, MI (US)

(72) Inventors: Nicholas Kalweit, Northville, MI (US); John Michael Fritz, West Bloomfield, MI (US); Joseph Yarnevich, Royal Oak, MI (US); Andrey M Ilinich, Novi, MI (US); Christopher Taylor, Livonia, MI (US); Thomas Kandow, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 433 days.

(21) Appl. No.: 17/307,184

(22) Filed: May 4, 2021

(65) Prior Publication Data

US 2021/0252577 A1 Aug. 19, 2021

Related U.S. Application Data

(62) Division of application No. 15/703,171, filed on Sep. 13, 2017, now Pat. No. 11,033,943.

(51) Int. Cl.

| | |
|---|---|
| ***B21C 51/00*** | (2006.01) |
| ***B05C 1/02*** | (2006.01) |
| ***B05C 5/02*** | (2006.01) |
| ***B05D 7/14*** | (2006.01) |
| ***B21D 22/02*** | (2006.01) |
| ***B21D 35/00*** | (2006.01) |
| *B05C 11/10* | (2006.01) |

(52) U.S. Cl.
CPC .............. *B21C 51/005* (2013.01); *B05C 1/02* (2013.01); *B05C 5/0225* (2013.01); *B05D 7/14* (2013.01); *B21D 35/002* (2013.01); *B05C 11/10* (2013.01); *B21D 22/02* (2013.01)

(58) Field of Classification Search
CPC ....... B21C 51/005; B05C 1/02; B05C 5/0225; B05C 11/10; B05D 7/14; B05D 1/26; B05D 5/00; B05D 7/24; B21D 35/002; B21D 22/02; B21D 37/16
See application file for complete search history.

(56) References Cited

U.S. PATENT DOCUMENTS

| | | | | |
|---|---|---|---|---|
| 5,791,061 A * | 8/1998 | Modugno | G01C 15/10 | 33/666 |
| 2004/0170467 A1* | 9/2004 | Ando | B43K 1/086 | 401/214 |
| 2008/0269031 A1* | 10/2008 | Lee | B23B 43/00 | 483/7 |

(Continued)

*Primary Examiner* — Francisco W Tschen
(74) *Attorney, Agent, or Firm* — Burris Law, PLLC

(57) ABSTRACT

A method of applying a marking to a part in a stamping die includes moving a component of the stamping die, the component having a mechanical application device secured thereto. A controlled volume of a marking medium flows through the mechanical application device during the moving such that a volume of the marking medium is controlled by the moving of the component during a stamping die operation. In one form, the component is an upper die of the stamping die.

20 Claims, 12 Drawing Sheets

(56) References Cited

U.S. PATENT DOCUMENTS

| | | | | |
|---|---|---|---|---|
| 2009/0273621 | A1* | 11/2009 | Folkers | B41J 2/165 347/70 |
| 2015/0004305 | A1* | 1/2015 | Campbell | G01K 11/12 266/90 |

* cited by examiner

MECHANICAL APPLICATOR FOR USE IN STAMPING DIE PROCESS TO APPLY THERMO-CHROMATIC INK TO ALUMINUM HEAT TREATED PANELS

CROSS-REFERENCE TO RELATED APPLICATIONS

This application is a divisional application of U.S. Ser. No. 15/703,171, filed Sep. 13, 2017 and titled "MECHANICAL APPLICATOR FOR USE IN STAMPING DIE PROCESS TO APPLY THERMO-CHROMATIC INK TO ALUMINUM HEAT TREATED PANELS," the contents of which are incorporated herein in their entirety.

FIELD

The present disclosure relates generally to stamping dies, and more particularly to applying a marking to parts formed in a stamping die process.

BACKGROUND

The statements in this section merely provide background information related to the present disclosure and may not constitute prior art.

The application of metal alloys, such as aluminum, is emerging in manufacturing and assembly processes in the automotive industry due to strength, low weight, environmental benefits such as recycling abilities, and the ability to absorb crash-induced energy.

In the stamping industry, more formable aluminum alloys are used to stamp an automotive component, such as a panel, into shape. Once the vehicle component is formed into its shape, it can be heat treated to attain desired mechanical properties, such as stiffness and strength. Proper identification of successful heat treatment to aluminum components is important to the manufacturing and assembly of safe and reliable vehicles. If weaker non-heat treated aluminum panels are mistakenly identified as heat treated panels, the weaker non-heat treated panels may still be assembled into a vehicle.

Aluminum components before and after the heat treatment process are visually undistinguishable, which presents a challenge in verifying which components have undergone the heat-treatment process. This challenge, among other challenges in the use of aluminum in manufacturing and assembly processes in the automotive industry are addressed by the present disclosure.

SUMMARY

The present disclosure generally provides a method of applying a marking to a part in a stamping die operation, wherein when one or more components of the stamping die moves, the volume of marking medium is controlled by the movement.

In one form, the method comprises moving a component of the stamping die, the component having a mechanical application device secured thereto, wherein a controlled volume of a marking medium flows through the mechanical application device during the moving such that a volume of the marking medium is controlled by the moving of the component during a stamping die operation.

In variations of this method, which may be employed individually or in any combination: the controlled volume of the marking medium is not regulated by either an external pneumatic source or an external electrical source; the marking medium is thermo-chromatic ink; the component is an upper die of the stamping die; the component is a lower die of the stamping die; causing an aperture of the mechanical application device to open to release the controlled volume of the marking medium during the stamping die operation; moving the mechanical application device until the mechanical application device contacts the part to create a void defined between the part and a portion of the mechanical application device, and further comprising releasing the controlled volume of the marking medium into the void, wherein in one form the void is surrounded by the portion of the mechanical application device, and in one variation the portion of the mechanical application device is an o-ring or a peripheral ledge; the mechanical application device defines an aperture and includes a movable component that is movable to block or open the aperture, and further comprising moving the movable component away from the part such that the controlled volume of the marking medium is released to the part when the component moves away from the part; the controlled volume of the marking medium is supplied by a gravity-feed supply line; and the controlled volume of the marking medium is supplied by a passive-pressure supply line.

In another method according to the present disclosure, a marking is applied to a part in a stamping die by moving an upper die of the stamping die, the upper die having a mechanical application device secured thereto, wherein a controlled volume of a marking medium flows through the mechanical application device during the moving such that a volume of the marking medium is controlled by the moving of the upper die during a stamping die operation.

In variations of this method, which may be employed individually or in any combination: the controlled volume of the marking medium is not regulated by either an external pneumatic source or an external electrical source and the marking medium is thermo-chromatic ink.

In still another form, a method of applying a marking to a part in a stamping die comprises moving a component of the stamping die toward the part, the component having a mechanical application device secured thereto, wherein when the component of the stamping die is moved toward the part during a stamping operation, a portion of the mechanical application contacts the part, opening an aperture of the mechanical application device by the part, and releasing a controlled volume of a marking medium through the aperture to the part. The controlled volume of a marking medium flows through the mechanical application device during the moving such that a volume of the marking medium is controlled by the moving during the stamping die operation.

In variations of this method, which may be implemented individually or in any combination: the controlled volume of the marking medium is not regulated by either an external pneumatic source or an external electrical source; and the mark medium is thermo-chromatic ink.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
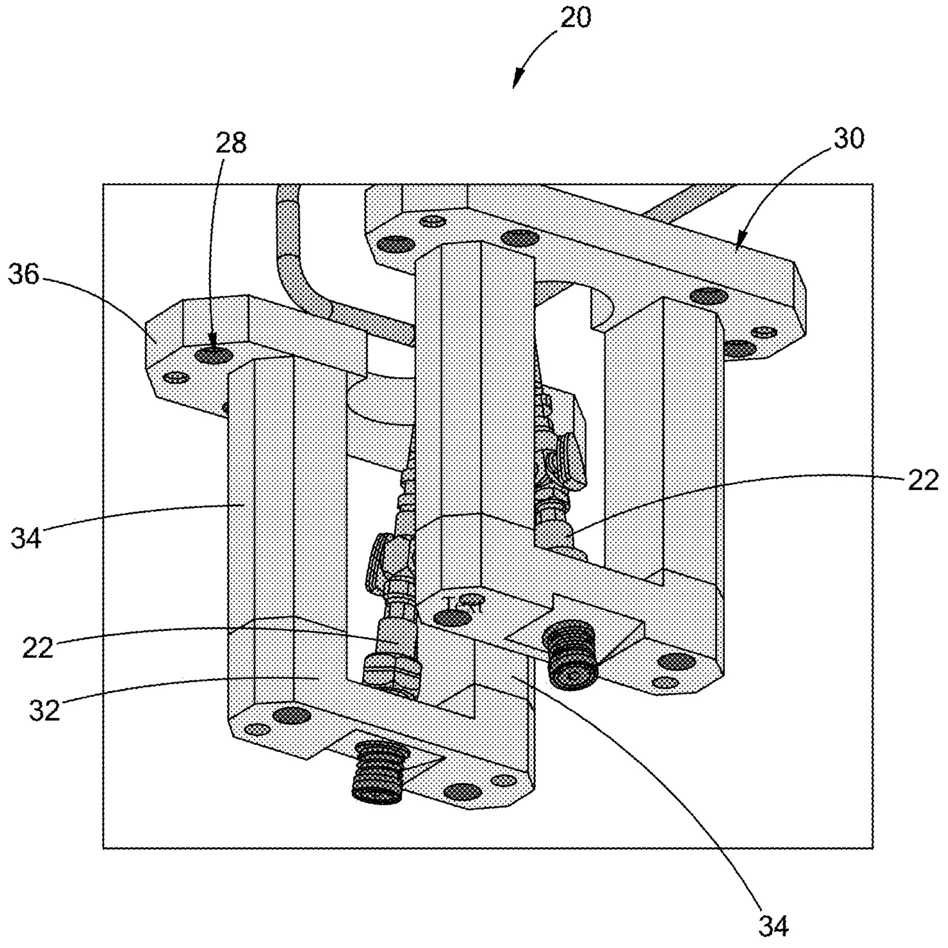
FIG. 1 is a perspective view of a system having a mechanical application device in accordance with the teachings of the present disclosure.
Figure 2:
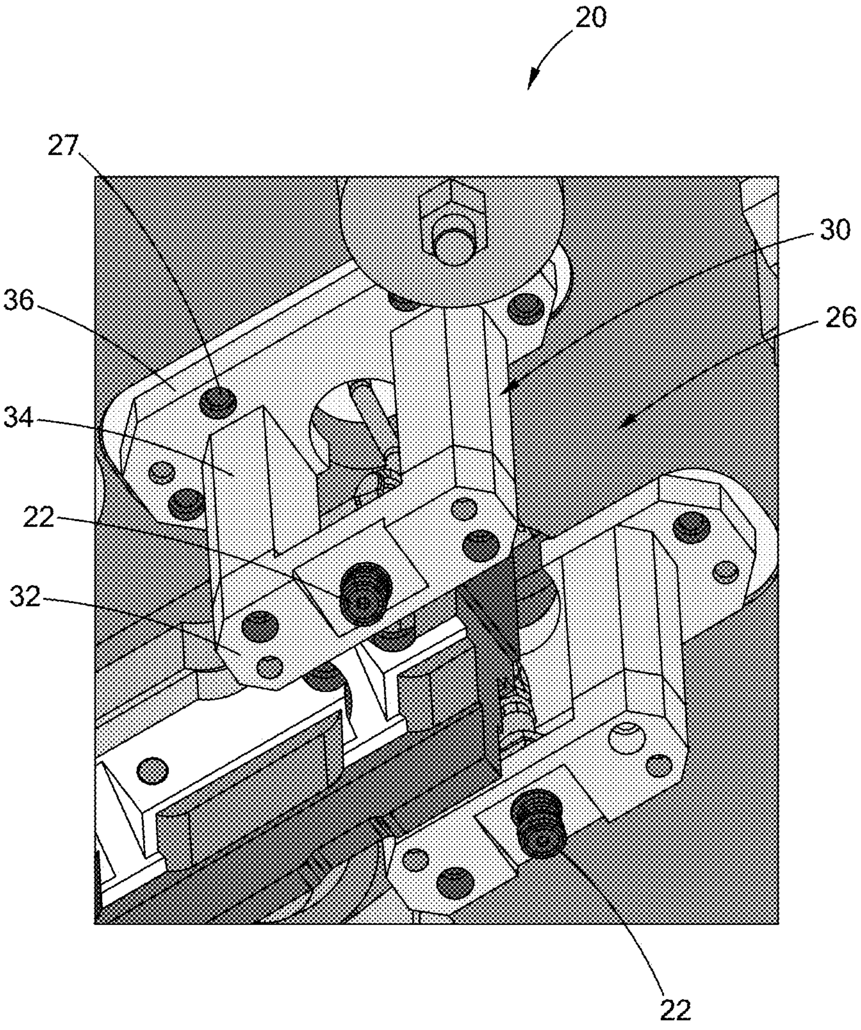
FIG. 2 is another perspective view of the system mounted to an upper die according to the present disclosure.
Figure 3:
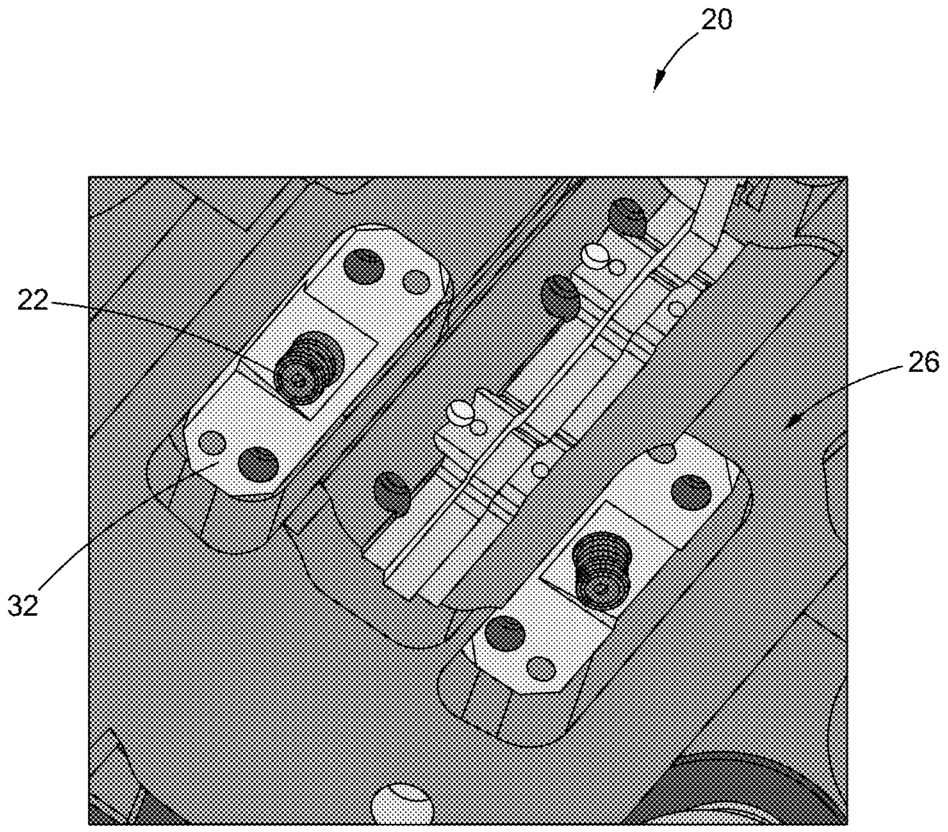
FIG. 3 is another view of the system mounted to an upper die of a stamping die according to the present disclosure.
Figure 4:
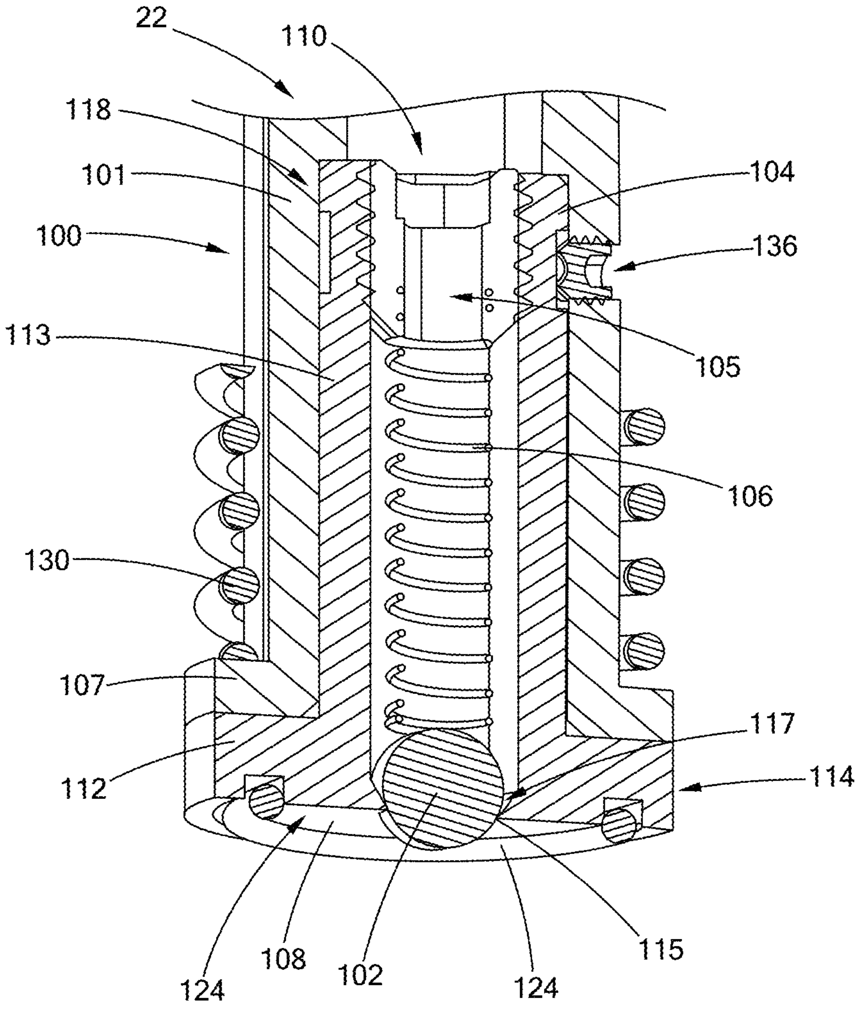
FIG. 4 is a perspective cross-sectional view of one form of a mechanical application device, having a dabber, constructed according to the present disclosure.

Referring to FIGS. 1-3, a system for applying a marking to a part in a stamping die according to one form of the present disclosure is illustrated and generally indicated by reference number 20. The system 20 comprises a mechanical application device 22 having a controlled volume of a marking medium (such as by way of example, a thermo-chromatic ink) that is coupled to movement of the stamping die. Although a system with two (2) mechanical application devices 22 is shown, it should be understood that one or more mechanical application devices 22 may be employed while remaining within the scope of the present disclosure.

The marking medium may be any of a variety of mediums and in one form, the marking medium is a thermo-chromatic ink. Because thermo-chromatic ink undergoes a change in color when exposed to an increase or decrease in temperature, the part being stamped, such as a part formed from an aluminum alloy, can be visually identified as successfully heat treated by marking the part with the thermo-chromatic ink by determining if there is a change in color. It should be understood that use of thermo-chromatic ink is merely exemplary and other forms of a marking medium may be employed while still remaining within the scope of the present disclosure, such as by way of example, any substance that can mark the part 10 such as a fluid or a powder, among other substances.

Advantageously, the controlled volume of marking medium is not regulated by either an external pneumatic source or an external electrical source and is instead regulated by mechanical movement of the stamping die. Accordingly, in one form, the system 20 consists of the mechanical application device 22, and only the mechanical application device 22, having a controlled volume of marking medium that is coupled to movement of the stamping die.

As further shown, the mechanical application device 22 is mounted within a holding fixture 30 in one form, which includes a receiving base 32, two opposed arms 34, and a mounting plate 36. The mounting plate 36 is secured to an upper die 26 of the stamping die, thus coupling the movement of the stamping die to movement of the mechanical application device as described in greater detail below. Alternatively, the mechanical application device 22 may be mounted to a lower die of the stamping die (not shown), among other components of the stamping die, provided the controlled volume of marking medium is coupled to movement of the stamping die. In other words, when one or more components of the stamping die moves, the volume of marking medium is controlled by the movement.

A variety of devices may be employed to mount the mechanical application device 22 to the stamping die, and in form the mounting plate 36 is secured to the upper die 26 with bolts 27 that extend through mounting holes 28. It should be understood, however, that other mounting means or fixtures to hold the mechanical application devices 22 may be employed while still remaining within the scope of the present disclosure.

Referring to FIGS. 4-7, one form of a mechanical application device 22 is illustrated in accordance with the present disclosure. In this form, the mechanical application device 22 comprises a housing 100, a ball 102, a retaining member 104, a resilient member 106, and a lower end surface applicator 108. The housing 100 defines an internal fluid reservoir 110 and a flange 112 disposed at a lower end portion 114 thereof. More specifically, in this form, the housing 100 is in two pieces, wherein the flange 112 is part of an insert 113 that is disposed within a housing body 101 as shown. The ball 102 is disposed within the housing 100 and forms a seal at the lower end portion 114 of the housing 100. The seal is formed between the ball 102 and an edge 115 of an aperture 117 formed through the insert 113. The ball 102 makes positive contact with the edge 115 by way of the resilient member 106, which in this form is a compression spring that is disposed between the ball 102 and the retaining member 104. The retaining member 104 is secured to an upper portion 118 of the insert 113 as shown. In this form, the retaining member 104 is a hollow component that includes a central opening 105 that allows for the passage of the marking medium.

The mechanical application device 22 further includes an o-ring 124 disposed within the lower end surface applicator 108 of the housing 100 and spaced radially away from the ball 102. The o-ring 124 makes contact with the part 10 to be marked as shown, and thus a void 126 is defined between the ball 102, the part, and the o-ring 124. The void 126 is configured to receive the marking medium as described in greater detail below.

Figure 5:
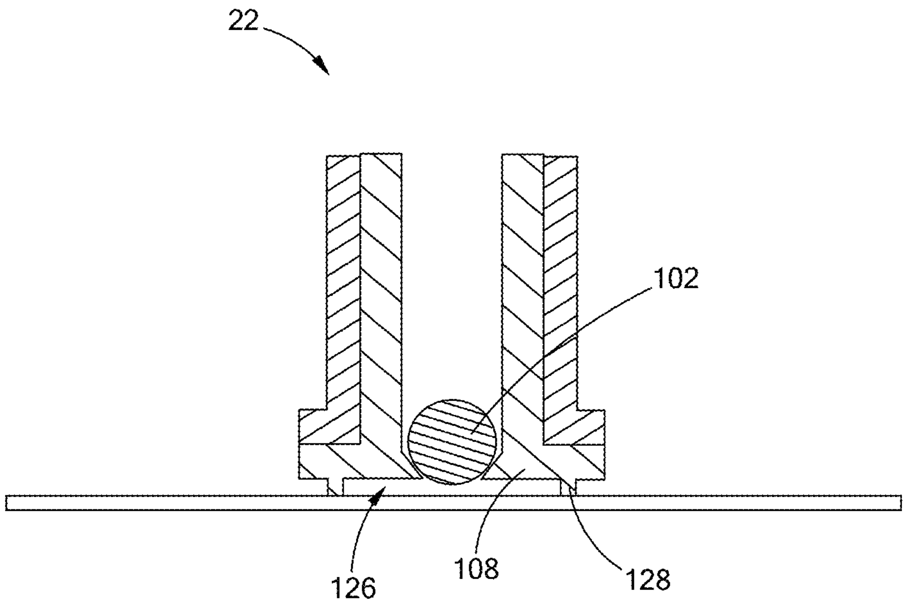
FIG. 5 is a cross-sectional view of an alternate form of a lower end surface applicator constructed in accordance with the principles of the present disclosure.
Figure 6:
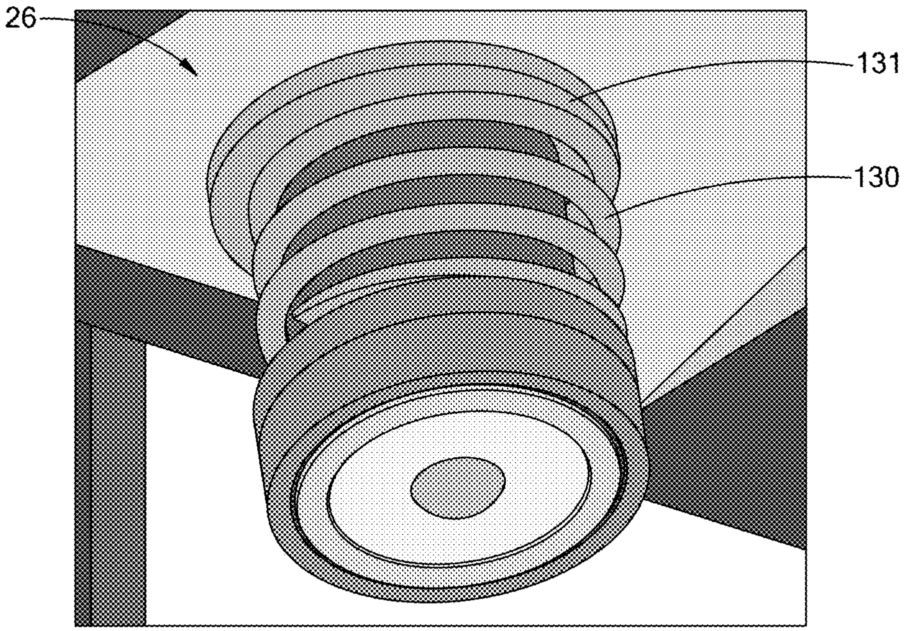
FIG. 6 is an enlarged perspective view of a distal end portion of the mechanical application device of FIG. 4 according to the present disclosure.

In another form as shown in FIG. 5, the o-ring 124 is replaced by a peripheral ledge 128 extending radially away from the lower end surface applicator 108. The peripheral ledge 128 makes contact with the part 10 to be marked as shown, and thus the void 126 is defined between the ball 102 and the peripheral ledge 128, the void 126 being configured to receive the marking medium.

The mechanical application device 22 further includes a displacement control spring 130 disposed against a bushing 131, which is secured to the upper die 26. The displacement control spring 130 engages the housing body 101 along a shoulder 107 and is sized to allow the lower end surface applicator 108 to remain against the part 10 to be marked during movement of the stamping die.

Figure 7:
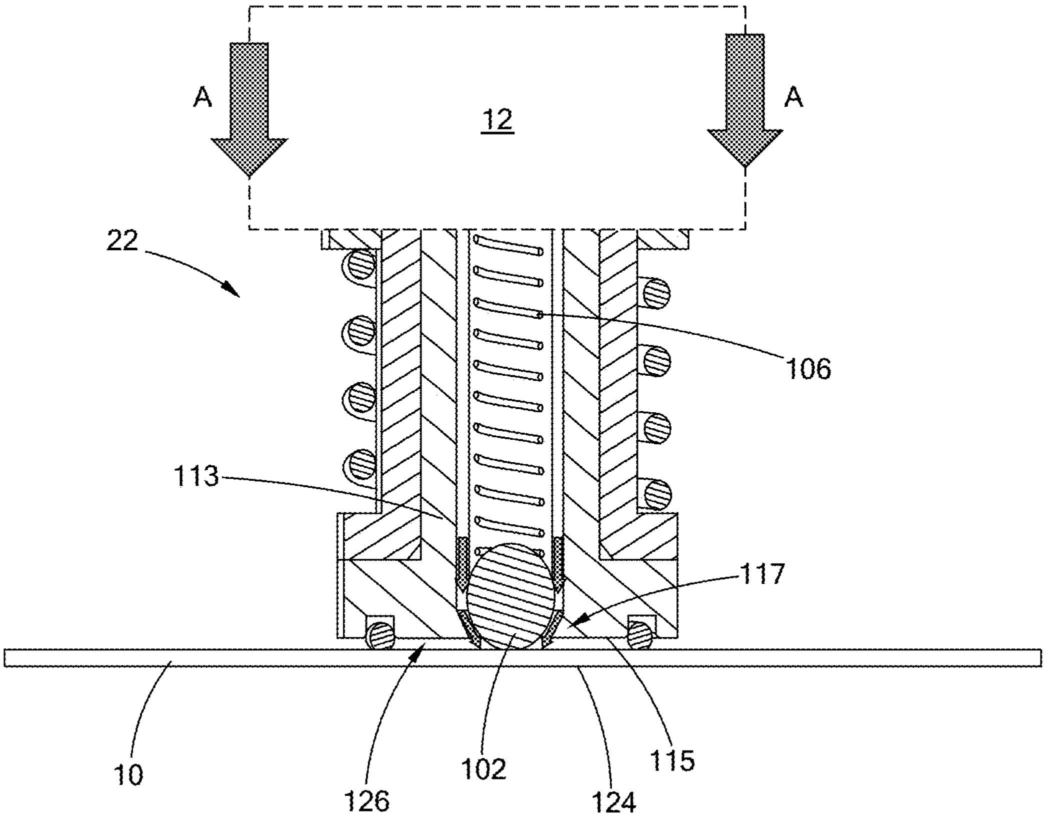
FIG. 7 is a cross-sectional view of the mechanical application device of FIG. 4 illustrating a volume of marking medium being controlled with movement of a stamping die according to the present disclosure.
Figure 8:
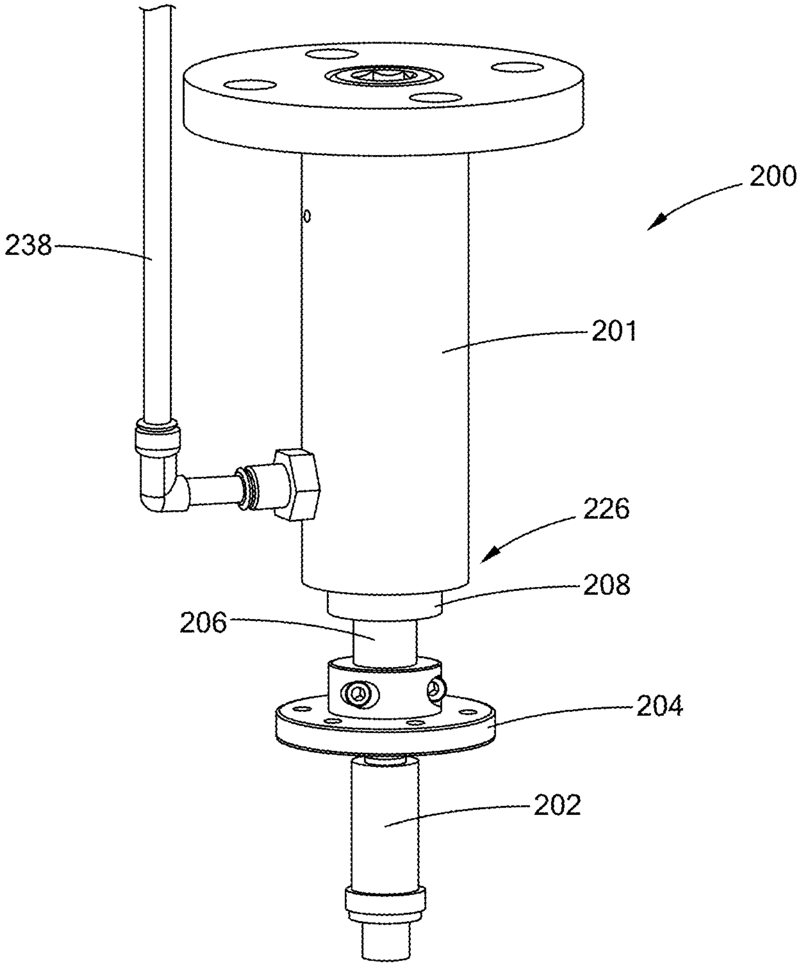
FIG. 8 is a perspective of another form of a mechanical application device, having a sprayer, constructed according to the present disclosure.
Figure 9:
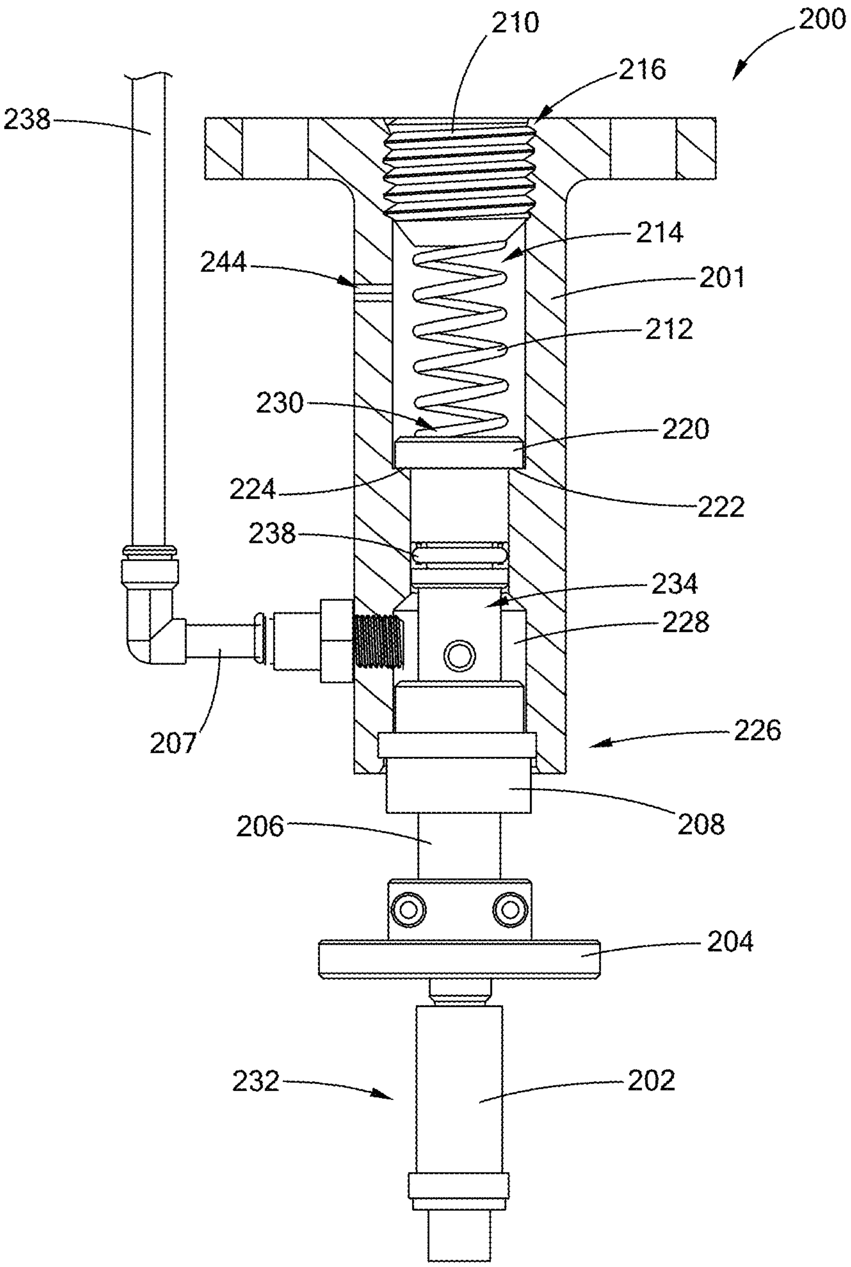
FIG. 9 is a side partial cross-sectional view of the mechanical application device of FIG. 8 according to the present disclosure.

Referring now to FIG. 7, in operation, as the stamping die 12 moves towards the part 10, the mechanical application device 22 moves in concert with the stamping die 12 in the direction of arrows A. As the mechanical application device 22 moves distally towards the part 10, the ball 102 makes contact with the part 10 and compresses the resilient member 106, thus moving the ball 102 proximally away from the part 10 and breaking the seal at the edge 115 of the aperture 117 formed through the insert 113. The o-ring 124 also makes contact with the part 10, and thus the marking medium flows into the void 126 and against the part 10, thereby marking the part 10.

Referring to FIGS. 8-11, another form of a mechanical application device is illustrated and generally indicated by reference numeral 200. In this form, the mechanical application device 200 is a "sprayer" as opposed to a "dabber" in the previously described form. The mechanical application device 200 comprises a housing 201, a nozzle 202, a collar 204 disposed around a distal end 232 of a plunger 206, and a rod gland 208 secured to a lower end portion 226 of the housing 201. The rod gland 208 functions to constrain actuation of plunger 206 against the housing 201 and to provide a seal to the internal fluid reservoir 228 from the external environment.

The housing 201 defines an internal cavity 214, and the plunger 206 is disposed within a cavity 214 as shown. The plunger 206 defines a flange 220, which seats the plunger 206 within the housing 201. The distal end 232 of the plunger 206 extends beyond the lower end portion 226 of the housing 201 as shown and is secured to the nozzle 202. The plunger 206 also includes an o-ring 238 (or other equivalent sealing device) to seal the cavity 214 from the marking medium.

A retaining member 210 and a resilient member 212 are disposed within the cavity 214 of the housing 201. The retaining member 210 seals a top portion 216 of the cavity 214 and is in contact with the resilient member 212 as shown. The resilient member 212 in this form is a compression spring, however, other forms of resilient members may be employed while remaining within the scope of the present disclosure. The resilient member 212 maintains a compressive force on the plunger 206 and biases the plunger 206 against the housing 201. More specifically, a lower surface 222 of the flange 220 makes positive contact with a shoulder 224 of the housing 201 when the resilient member 212 is biased. When the collar 204 of the mechanical application device 201 contacts a part being formed, or a portion of the stamping die 12, as described in greater detail below, the plunger 206 is displaced proximally, thus allowing a flow of marking medium into the housing 201. More specifically, the lower end portion 226 of the housing 201 defines an internal fluid reservoir 228 that surrounds a portion 234 of the plunger 206. The plunger 206 defines a passageway 242 that is in fluid communication with the internal fluid reservoir 228, through which the marking medium flows to the nozzle 202.

Figure 12:
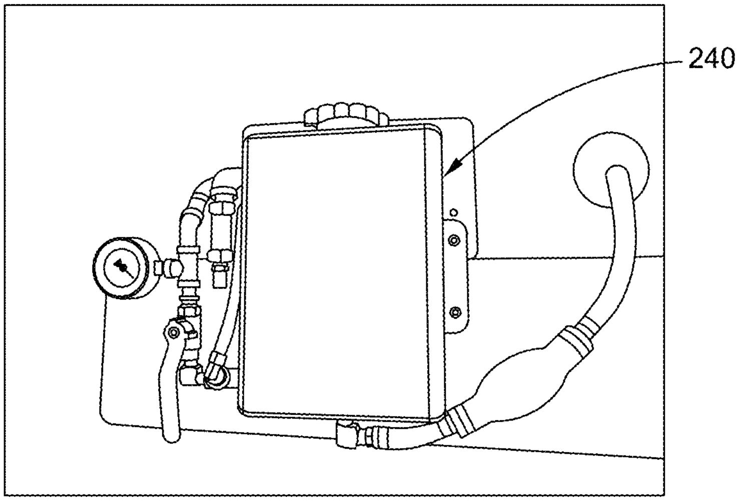
FIG. 12 is a perspective view of a fluid reservoir assembly mounted to a stamping die according to the teachings of the present disclosure.

The mechanical application device 200 further comprises a supply line 238, which may be a gravity-feed supply line in one form of the present disclosure. In another form, the gravity-feed supply line is a passive-pressure supply line. The supply line 238 extends from a fluid reservoir assembly 240 (FIG. 12) that stores the marking medium to the mechanical application device 200. A check valve 207 is also employed in one form, and along with the nozzle 202, controls the direction of flow of the marking medium. When the mechanical application device 200 is moving with the stamping die 12 and contacts a part, a predetermined volume of marking medium is drawn from the fluid reservoir assembly 240 to the internal fluid reservoir 228 and into the nozzle 202, which is described in greater detail below.

Figure 10:
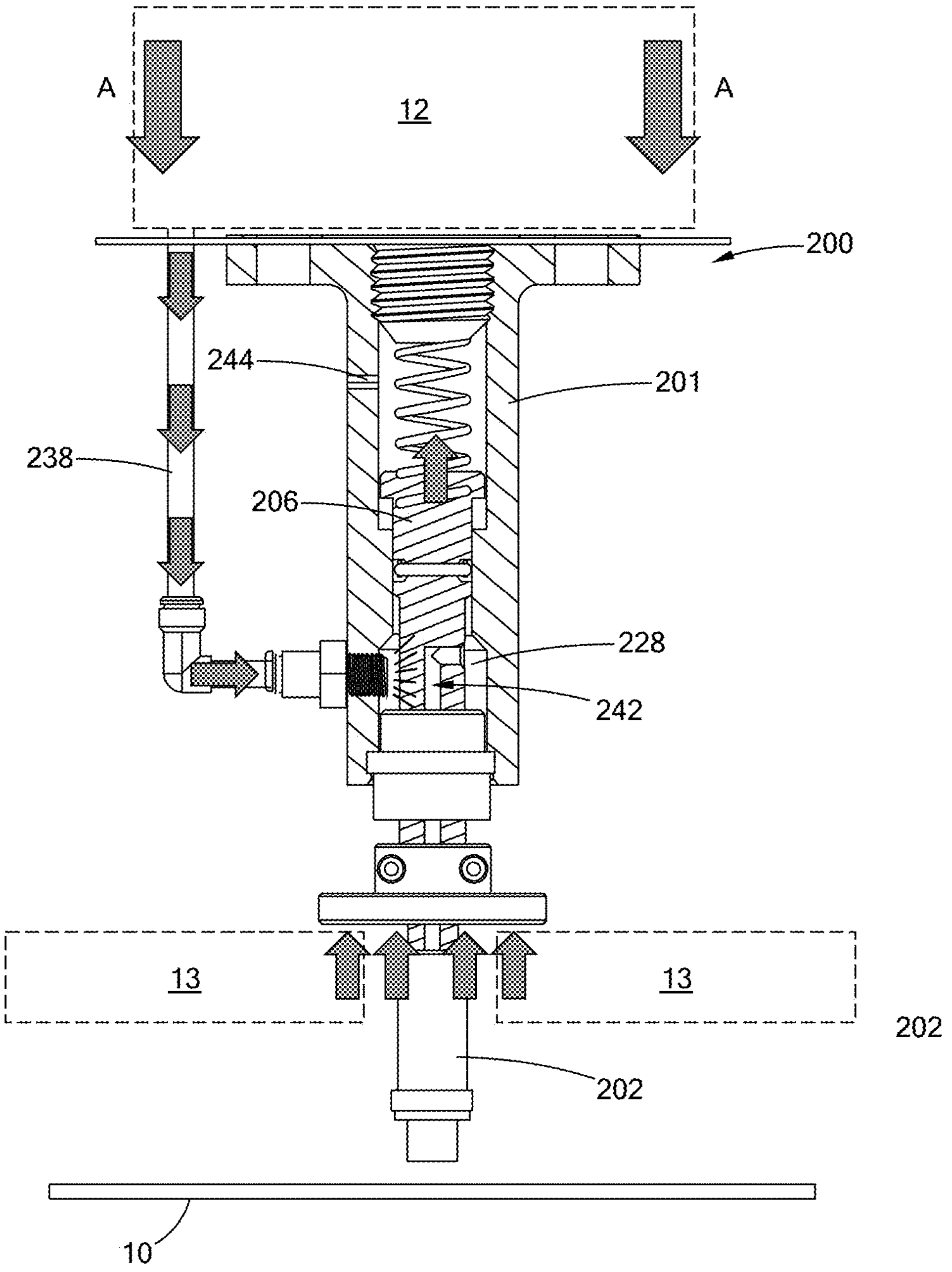
FIG. 10 is a side partial cross-sectional view of the mechanical application device of FIG. 8 with the device activated according to the present disclosure.
Figure 11:
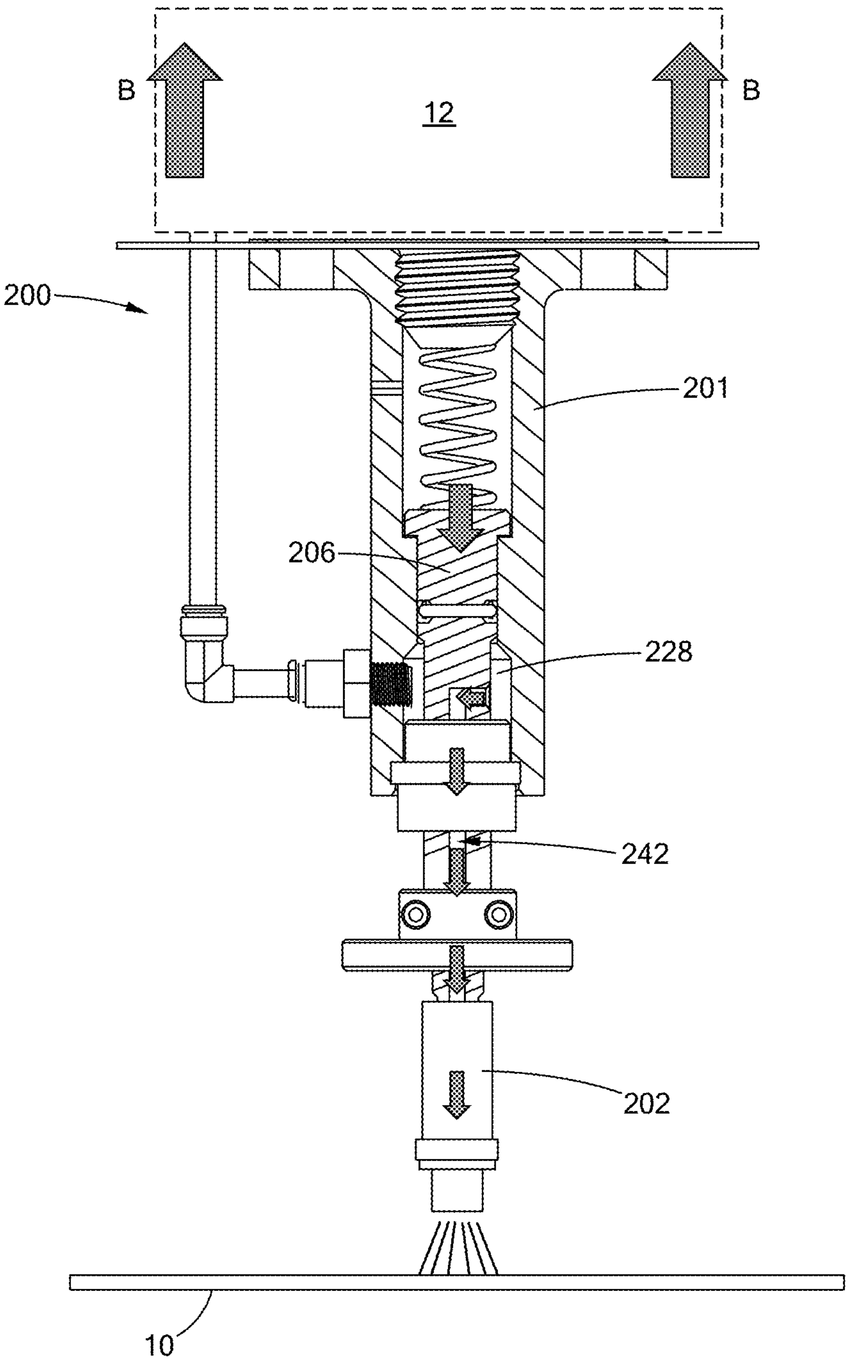
FIG. 11 is a side partial cross-sectional view of the mechanical application device of FIG. 8 with the device activated and spraying a controlled volume of marking medium according to the present disclosure.

Referring now to FIGS. 10 and 11, in operation, as the stamping die 12 moves towards the part 10 that is being formed, the mechanical application device 200 moves in concert with the stamping die 12 in the direction of arrows A. As the mechanical application device 200 moves distally towards the part 10, the collar 204 makes contact a portion of a pad 13, which causes the plunger 206 to move proximally (or upwards) within the housing 201 in an axial direction to fill the internal fluid reservoir 228. During this movement, the passageway 242 within the plunger 206 is exposed to the internal fluid reservoir 228 and the supply of marking medium from the fluid reservoir assembly 240. The marking medium thus flows through the mechanical application device 200 and towards the nozzle 202. As further shown, a vent 244 is provided in order to relieve pressure buildup from actuation of the plunger 206 in the cavity 214.

Referring now to FIG. 11, as the stamping die 12 moves away from the part 10 that is being formed, the mechanical application device 200 moves in concert with the stamping die 12 in the direction of arrows B. As the mechanical application device 200 moves distally away from the part 10, the plunger 206 extends relative to the housing 201 and the marking medium within the internal fluid reservoir 228 is forced to exit the nozzle 202, thereby marking the part 10 that is being formed.

As previously set forth, the controlled volume of marking medium is not regulated by either an external pneumatic source or an external electrical source and is instead regulated by mechanical movement of the stamping die 12.

In summary, the system 20 of the present disclosure applies a marking medium directly onto the part 10 during a stamping die operation. The marking medium in one form is thermo-chromatic ink, which allows for easy detection of successfully heat treated components. Application of the thermo-chromatic ink automatically during stamping die operations increases efficiency and reduces manufacturing costs associated with other ink application devices by reducing the amount of equipment, labor, handling, and shipping, among other resources.

It should be noted that the disclosure is not limited to the various forms described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of applying a marking to a part in a stamping die, the method comprising:

moving a component of the stamping die, the component having a mechanical application device secured thereto, the mechanical application device including a housing defining an internal fluid reservoir and a movable component provided at an aperture of the internal fluid reservoir to selectively block or open the aperture;

pushing the movable component upward by the part to open the aperture when the mechanical application device contacts the part such that a controlled volume of a marking medium flows through the internal fluid reservoir and the aperture of the mechanical application device and is applied on the part, wherein a flange extends from a lower end portion of the housing, and wherein the mechanical application device further includes a portion protruding from a bottom surface of the flange to define a void between the part and the bottom surface of the flange when the portion of the mechanical application device contacts the part.

2. The method according to claim 1, wherein the controlled volume of the marking medium is not regulated by either an external pneumatic source or an external electrical source.

3. The method according to claim 1, wherein the marking medium is thermo-chromatic ink.

4. The method according to claim 1, wherein the component is an upper die of the stamping die.

5. The method according to claim 1, wherein the component is a lower die of the stamping die.

6. The method according to claim 1, further comprising moving the mechanical application device until the mechanical application device contacts the part to create the void defined between the part and the portion of the mechanical application device.

7. The method according to claim 6, further comprising releasing the controlled volume of the marking medium into the void.

8. The method according to claim 6, wherein the void is surrounded by the portion of the mechanical application device.

9. The method according to claim 8, wherein the portion of the mechanical application device is an o-ring or a peripheral ledge.

10. The method according to claim 1, wherein the controlled volume of the marking medium is supplied by a gravity-feed supply line.

11. The method according to claim 1, wherein the controlled volume of the marking medium is supplied by a passive-pressure supply line.

12. The method according to claim 1, wherein the controlled volume of the marking medium is applied in an area of the part surrounded by the portion of the mechanical application device.

13. The method according to claim 1, wherein the movable component is surrounded by the portion of the mechanical application device.

14. The method according to claim 1, wherein the flange is biased toward the part to maintain contact with the part when the mechanical application device contacts the part.

15. A method of applying a marking to a part in a stamping die, the method comprising:

moving an upper die of the stamping die, the upper die having a mechanical application device secured thereto, the mechanical application device including a housing defining an internal fluid reservoir and a movable component provided at an aperture of the internal fluid reservoir to selectively block or open the aperture;

pushing the movable component upward by the part to open the aperture when the mechanical application device contacts the part such that a controlled volume of a marking medium flows through the internal fluid reservoir and the aperture of the mechanical application device and is applied on the part, wherein a flange extends from a lower end portion of the housing, and wherein the mechanical application device further includes a portion protruding from a bottom surface of the flange to define a void between the part and the bottom surface of the flange when the portion of the mechanical application device contacts the part.

16. The method according to claim 15, wherein the controlled volume of the marking medium is not regulated by either an external pneumatic source or an external electrical source.

17. The method according to claim 15, wherein the marking medium is thermo-chromatic ink.

18. A method of applying a marking to a part in a stamping die, the method comprising:

moving a component of the stamping die toward the part, the component having a mechanical application device secured thereto, the mechanical application device including a housing defining an internal fluid reservoir and a movable component provided at an aperture of the internal fluid reservoir to selectively block or open the aperture, wherein when the component of the stamping die is moved toward the part during a stamping operation, a portion of the mechanical application contacts the part;

pushing the movable component upward by the part to open the aperture of the mechanical application device when the mechanical application device contacts the part; and releasing a controlled volume of a marking medium through the aperture to the part, wherein the controlled volume of the marking medium flows through the mechanical application device during the moving such that a volume of the marking medium is controlled by the moving during the stamping die operation, wherein a flange extends from a lower end portion of the housing, and wherein the portion of the mechanical application device protrudes from a bottom surface of the flange to define a void between the part and the bottom surface of the flange when the portion of the mechanical application device contacts the part.

19. The method according to claim 18, wherein the controlled volume of the marking medium is not regulated by either an external pneumatic source or an external electrical source.

20. The method according to claim 18, wherein the marking medium is thermo-chromatic ink.

* * * * *